Patented July 9, 1940

2,206,885

UNITED STATES PATENT OFFICE 2,206,885

AZO COMPOUNDS AND PROCESS FOR COLORING THEREWITH

Joseph B. Dickey, Rochester, N. Y., assignor to Eastman Kodak Company, Rochester, N. Y., a corporation of New Jersey No Drawing. Application August 16, 1938, Serial No. 225,200

15 Claims. (Cl. 8—50)

This invention relates to aromatic azo compounds and their application to the art of dyeing or coloring. More particularly, the invention relates to aromatic azo dye compounds containing a nitroalkylamino group and the application of the nuclear non-sulfonated azo dye compounds for the dyeing or coloring of organic derivatives of cellulose.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate propionate, cellulose acetate-butyrate, and the cellulose ethers, such as methyl cellulose, ethyl cellulose or benzyl cellulose.

The aromatic azo dye compounds of my invention have the general formula: R—N=N—R$_1$ wherein R represents the residue of an aromatic nucleus and R$_1$ represents a member selected from the group consisting of an aryl nucleus of the benzene series and an aryl nucleus of the naphthalene series, said member containing a nitroalkylamino group which is joined directly to the nucleus thereof through the nitrogen atom of the amino portion of said nitroalkylamino group and in which the nitro group is separated from the nuclear nitrogen atom by at least two carbon atoms. Both sulfonated and unsulfonated compounds are included within the scope of my invention.

The aromatic azo dye compounds of my invention can be prepared by coupling a diazotized aromatic amine with a coupling component of the benzene or naphthalene series containing a nitroalkylamino group which is joined directly to the nucleus thereof through the nitrogen atom of the amino portion of said nitroalkylamino group and in which the nitro group is separated from the nuclear nitrogen atom by at least two carbon atoms.

In order that my invention may be clearly understood, it will be noted that the expression "a nitroalkylamino group" includes not only nitroalkylamino groups in which the alkyl group is unsubstituted except by nitro such as

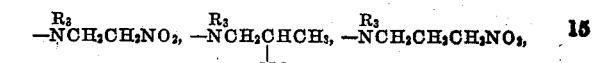
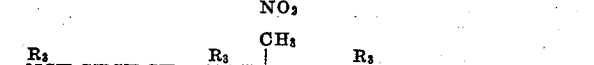
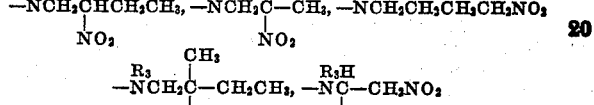

and $$-\overset{R_3}{N}CH_2CH_2CH_2CH_2CH_2NO_2$$

but also nitroalkylamino groups in which the alkyl group is substituted with a group other than nitro such as

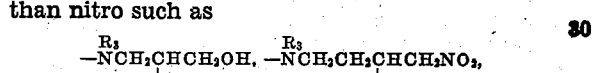
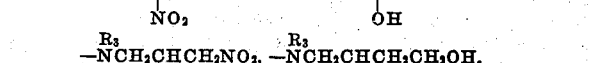
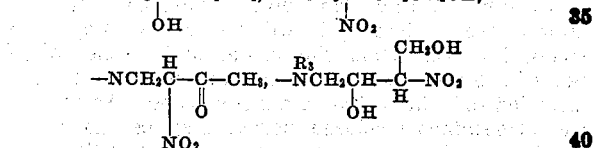

and

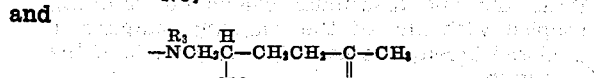

for example. These groups will be termed unsubstituted nitroalkylamino groups and substituted nitroalkylamino groups respectively. The letter R$_3$ indicates that the nuclear amino group may be substituted. R$_3$ may be hydrogen, an alkyl group, an aralkyl group, a cycloalkyl group or a heterocyclic group, for example.

The aromatic azo dye compounds of my invention find application for the coloring of cellulose ester lacquers, cellulose acetate plastic materials, silk, wool and organic derivatives of cellulose. The nuclear non-sulfonated aromatic azo dye compounds of my invention are more particularly adapted for the coloration of textile materials made of or containing an organic derivative of cellulose yielding shades ranging from yellow to blue-green although they possess application for the coloration of the other above named materials yielding generally similar shades thereon. The nuclear sulfonated compounds possess little or no utility for the coloration of organic derivatives of cellulose but they can be employed to color textile materials such as silk and wool.

For the dyeing of textile materials made of or containing an organic derivative of cellulose such as cellulose acetate silk, nuclear non-sulfonated compounds wherein R and R₁ each represents the residue of a phenyl nucleus have been found to be generally advantageous. Nuclear non-sulfonated compounds wherein R₁ is a naphthalene nucleus can be employed to color textile materials made of or containing an organic derivative of cellulose but the colorations yielded when R₁ is a phenyl nucleus are generally considerably more light fast than the colorations obtained when R₁ is a naphthalene nucleus.

Arylamines that can be employed in the preparation of the azo compounds of our invention include, for example, aniline, nitro-substituted anilines, such as p-nitroaniline and 2,4-dinitroaniline, halogen substituted anilines, such as p-chloroaniline, o-chloro-p-nitroaniline, o-bromoaniline, p-iodoaniline and 2,4-dichloroaniline, alkyl substituted anilines such as o-methylaniline, p-ethylaniline, o-β-methoxyethylaniline and o-chloro-p-methylaniline, alkoxy substituted anilines, such as p-methoxyaniline, o-β-methoxyethoxyaniline and p-butoxyaniline, keto substituted anilines such as p-aminoacetophenone and p-aminophenylpropyl ketone, sulfonated anilines such as 1-amino-2-sulfonic benzene and 1-amino-2-sulfonic-4-nitrobenzene and naphthylamines such as α-naphthylamine, β-naphthylamine, 1-amino-4-hydroxynaphthalene, 1-amino-2-sulfonic naphthalene, 1-amino-4-nitronaphthalene, and 1-amino-8-hydroxynaphthalene. Further, arylamines such as p-aminobenzophenone, o-aminobenzophenone, p-aminodiphenylamine, and p-aminoazobenzene can be used. As a further illustration of the arylamines which can be employed in the preparation of the azo compounds of my invention, reference may be had to U. S. Patents Nos. 2,107,898 and 2,115,030, issued February 8, 1938, and April 26, 1938, respectively, wherein additional suitable arylamines are disclosed. It will be clearly understood, however, that the arylamines disclosed herein are given by way of example and are not intended to be limitative of the invention. Any of the arylamines disclosed herein may be diazotized and the diazonium compound resulting coupled with any of the coupling components disclosed herein to obtain dye compounds of the invention.

The following examples illustrate the preparation of the dye compounds of my invention.

*Example 1*

12.6 grams of o-chloroaniline are added to 200 cc. of water to which has been added 30 cc. of 36% hydrochloric acid. The resulting solution is cooled to a temperature approximating 0–5° C. and the amine is diazotized while maintaining this temperature by the addition, with stirring, of a water solution of 6.9 grams of sodium nitrite.

18.0 grams of β-nitroethyl-m-toluidine are dissolved in a dilute aqueous hydrochloric acid solution and the resulting solution is cooled to a temperature approximating 0–10° C. The diazonium solution prepared above is then added, with stirring, while maintaining a temperature of 0–10° C. and during the coupling reaction which takes place, sodium acetate is added from time to time to keep the reaction mixture neutral to Congo red paper. Upon the completion of the coupling reaction, the dye compound formed is precipitated by the addition of water, recovered by filtration, washed with water and dried. The dye compound formed has the formula:

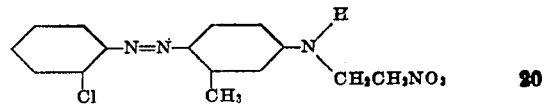

and colors cellulose acetate silk a yellow shade of good fastness to light and washing. Wool and silk are similarly colored a yellow shade by this dye compound.

*Example 2*

13.5 grams of p-aminoacetophenone are diazotized in the usual manner and the diazonium compound formed is coupled with 24 grams of β-nitroethylglycerylaniline. The dye compound formed has the formula:

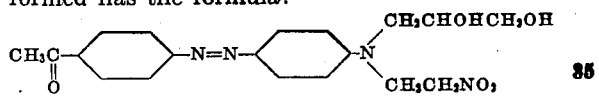

and colors cellulose acetate silk an orange shade of good fastness to light and washing.

*Example 3*

13.8 grams of p-nitroaniline are diazotized and the diazonium compound resulting is coupled with 22.4 grams of β-hydroxyethyl-β-nitropropylaniline. The dye compound formed has the formula:

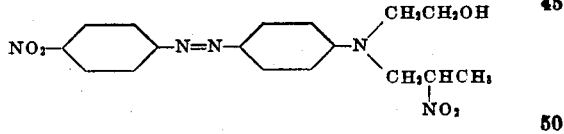

and colors cellulose acetate silk a red shade.

*Example 4*

17.2 grams of 1-amino-2-chloro-4-nitrobenzene are diazotized and the diazonium compound formed is coupled with 22.4 grams of β-nitroethyl - β - hydroxyethyl - m - toluidine. The dye compound formed has the formula:

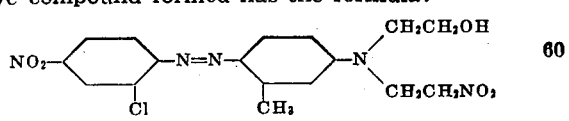

and colors cellulose acetate silk a rubine shade.

*Example 5*

18.3 grams of 1-amino-2,4-dinitrobenzene are diazotized and the diazonium compound resulting is coupled with 23.2 grams of α-β-nitroethylamino-5-naphthol. The dye compound obtained has the formula:

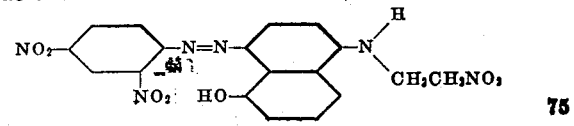

This compound colors cellulose acetate silk, wool and silk a purple shade.

*Example 6*

21.7 grams of 1-amino-2,4-dinitro-6-chlorobenzene are diazotized and the diazonium compound resulting is coupled with 26.0 grams of β-hydroxyethyl-β-nitroethyl-α-naphthylamine. The dye compound obtained has the formula:

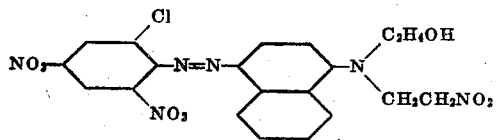

This compound colors cellulose acetate silk, wool and silk a blue shade.

*Example 7*

18.0 grams of

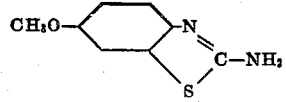

are diazotized and the diazonium compound resulting is coupled with 25.3 grams of

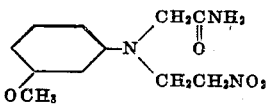

The dye compound obtained has the formula:

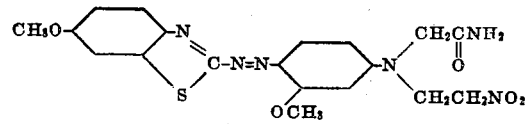

and colors cellulose acetate silk a rubine shade.

*Example 8*

12.6 grams of o-chloroaniline are diazotized as described in Example 1 and the diazonium compound resulting is coupled with 19.5 grams of γ-nitropropyl-m-toluidine. The dye compound obtained colors cellulose acetate silk, wool and silk a yellow shade.

*Example 9*

13.5 grams of p-aminoacetophenone are diazotized and the diazonium compound formed is coupled with 24 grams of Δ-nitro-butyl-β-hydroxyethylaniline. The dye compound obtained in accordance with this example colors cellulose acetate silk an orange shade from an aqueous suspension of the dye.

*Example 10*

13.8 grams of p-nitroaniline are diazotized and the diazonium compound formed is coupled with 28.4 grams of γ-nitro-β-hydroxyisobutyl glyceryl aniline. The dye compound obtained in accordance with this example colors cellulose acetate silk a red shade.

*Example 11*

21.7 grams of 1-amino-2-bromo-4-nitrobenzene are diazotized and the diazonium compound formed is coupled with 28.3 grams of γ-nitropropyl-β-nitroethyl-m-anisidine. The dye compound obtained colors cellulose acetate silk a rubine shade.

*Example 12*

24 grams of 1-amino-2-iodo-4-nitrobenzene are diazotized and the diazonium compound formed is coupled with 0.1 gram mole of

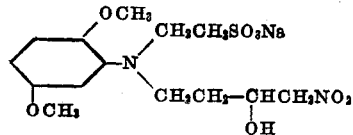

The dye compound obtained colors cellulose acetate silk, wool and silk a rubine shade.

*Example 13*

19.7 grams of p-aminoazobenzene are diazotized and the diazonium compound formed is coupled with 0.1 gram mole of γ-nitro-β-hydroxypropyl-1-amino-5-naphthol. The dye compound obtained colors cellulose acetate silk a blue shade.

*Example 14*

18.3 grams of 1-amino-2,4-dinitrobenzene are diazotized and the diazonium compound formed is coupled with 0.1 gram mole of benzyl-γ-nitro-2-hydroxypropyl-m-toluidine. The dye compound obtained colors celluose acetate silk a violet shade.

*Example 15*

0.1 gram mole of 1-amino-2-sulfonic-4-nitrobenzene are diazotized and the diazonium compound formed is coupled with 0.1 gram mole of ε-nitro-amylaniline. The dye compound obtained colors wool and silk an orange-red shade.

*Example 16*

0.1 gram mole of 1-amino-2-chloro-4-nitrobenzene is diazotized and the diazonium compound formed is coupled with 0.1 gram mole of

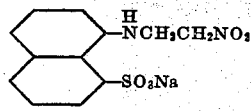

The dye compound obtained colors wool a violet shade.

The following tabulation further illustrates the compounds of my invention together with the color they produce on cellulose acetate silk. The compounds indicated below may be prepared by diazotizing the amines listed under the heading "amine" and coupling the diazonium compounds formed with the compounds specified in the column entitled "coupling component."

| Amine | Coupling component | Color on cellulose acetate silk |
|---|---|---|
| o-(Fl, Cl, Br, I) aniline | (1) ![structure with OCH₃, N-H, OCH₃, CH₂CH₂NO₂] | Yellow. |
| Do | (2) ![structure with OCH₃, N-H, C(CH₃)(H)-CH₂NO₂] | Do. |

| Amine | Coupling component | | Color on cellulose acetate silk |
|---|---|---|---|
| o-(Fl, Cl, Br, I) aniline | (3) | benzene ring with OCH₃, CH₃, N(CH₂CHOHCH₂OH)(CH₂CH₂NO₂) | Do. |
| Do | (4) | benzene ring with CH₃, CH₃, N(CH₂CH₂CH₂OH)(CH₂CH₂NO₂) | Do. |
| Do | (5) | diphenyl-N-CH₂CH₂NO₂ | Do. |
| Do | (6) | phenyl-N(morpholinyl-like: CH₂—CH₂, CH, CH₂—CH₂, CH₂)(CH₂CH₂NO₂) | Do. |
| Do | (7) | benzene with Cl, N(C₂H₄OCH₃)(CH₂CH—CH₂SO₃H with NO₂) | Do. |
| Do | (8) | benzene with CH₃, N(CH₂CH₂NO₂)₂ | Do. |
| Do | (9) | phenyl-N(CH₂CN)(CH₂CH₂NO₂) | Do. |
| Do | (10) | phenyl-N(C₂H₄OSO₃Na)(CH₂CH₂NO₂) | Do. |
| Do | (11) | benzene with OCH₃, OCH₃, N(C₂H₅)(CH₂CH—CH₂OH with NO₂) | Do. |
| Do | (12) | phenyl-N(CH₂CH₂CCH₃=O)(CH₂CH₂NO₂) | Do. |
| Do | (13) | phenyl-N(CH₂CH₂NO₂)(CH₂CH₂SO₃Na) | Do. |
| 1-amino-2,5-dimethoxy-benzene | 1–13 above | | Do. |
| 1-amino-2,5-dichloro-benzene | do | | Yellow to orange-yellow. |
| 1-amino-2-methyl-5-chlorobenzene | do | | Do. |
| 1-amino-2-methoxy-5-chlorobenzene | do | | Do. |
| 1-amino-2-chloro-5-methylbenzene | do | | Do. |
| p-Aminoacetophenone | do | | Orange. |
| p-Nitroaniline | do | | Orange to rubine. |
| 1-amino-2-methoxy-4-Nitrobenzene | do | | Orange to red. |
| 1-amino-2-halo-4-Nitrobenzene | do | | Orange to wine. |
| 1-amino-2-hydroxy-4-Nitrobenzene | do | | Do. |
| p-Aminoazobenzene | do | | Orange to rubine. |
| p-Aminoacetanilide | do | | Yellow to orange-yellow. |
| p-Aminodiphenylamine | do | | Do. |
| p-Nitroaniline | (14) β-nitroethyl-α-naphthylamine | | Rubine. |
| Do | (15) β-nitroethyl-β-hydroxyethyl-α-naphthylamine | | Do. |
| Do | (16) β-nitroethyl-β-sulfoethyl-α-naphthylamine | | Do. |
| Do | (17) β-nitroethylglyceryl-α-naphthylamine | | Do. |
| Do | (18) β-nitropropyl-α-naphthylamine | | Do. |
| Do | (19) α,β-nitroethylamino-5-naphthol | | Blue. |
| 1-amino-2-chloro-4-nitrobenzene | 14–19 above | | Rubine to blue. |
| 1-amino-2,4-dinitro-6-halobenzene | do | | Purple to blue-green. |
| 1-amino-2,4-dinitro-benzene | do | | Do. |

In order that my invention may be clearly understood, the preparation of a number of intermediate compounds which may be employed in the preparation of azo dye compounds of my invention will now be described.

Preparation of β-nitroethylaniline

This compound may be prepared by reaction between aniline and nitroethylene as described in Berichte den Deutschen Chemischen Gesellschaft, vol. 52, pg. 900. Nitroethylene may be prepared as described in Berichte, vol. 52, pg. 899.

Preparation of β-nitroethyl-β-hydroxyethylaniline

By the substitution of β-hydroxyethylaniline for aniline in the above reaction, β-nitroethyl-β-hydroxyethylaniline can be prepared. Similarly, it will be understood that other aniline derivatives can be substituted for aniline in the above reaction. Again, by the use of β-nitro-β-methylethylene in the reaction shown by the Berichte reference aniline derivatives containing a β-nitro-β-methyl ethyl group can be prepared. β-nitro-β-methyl ethylene can be prepared by heating

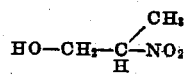

with potassium acid sulfate.

Naphthalene compounds containing a β-nitroalkylamino group can be prepared by reacting a naphthylamine such as α-naphthylamine with nitroethylene and β-nitro-β-methyl ethylene. Other benzene and naphthalene compounds containing a β-nitroalkylamino group can be prepared by the use of other suitable β-nitro alkylene compounds such as

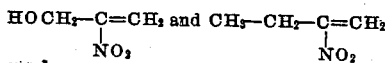

for example.

Preparation of γ-nitro-β-hydroxypropylaniline

This compound can be prepared by reacting

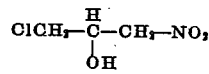

with aniline.

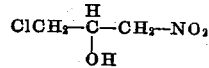

can be prepared by reacting the chloraldehyde ClCH₂CHO with CH₃NO₂.

Preparation of γ-nitro-β-methyl-β-hydroxypropylaniline

This compound can be prepared by reacting

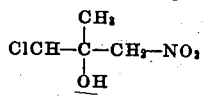

with aniline.

Aniline derivatives can be substituted for aniline in these last two examples to obtain the corresponding aniline derivative compounds. Similarly, a naphthylamine such as α-naphthylamine may be employed. The intermediates of the type described in the two examples just given may, generally speaking, be prepared by reacting halogenated aldehydes with nitrohydrocarbons using an alkali as a catalyst and then reacting the resulting halogenated nitroalkyl with aniline or α- or γ-naphthylamine or derivative thereof. In place of the above nitro halogenated alcohols, halogenated nitrohydrocarbons such as 1-bromo-3-nitropropane and 1-chloro-4-nitrobutane, for example, may be employed.

The azo dye compounds of my invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of my invention which are water-soluble such as those containing one or more sulfonic acid groups do not, of course, require the use of a dispersing or solubilizing agent but may be applied to silk, wool and (depending on the nature and position of the water-solubilizing group) organic derivatives of cellulose textile materials from an aqueous solution of the dye which may contain salt. For a more complete description as to how the azo dye compounds of my invention may be employed in dyeing or coloring operations, reference may be had to McNally and Dickey United States Letters Patent No. 2,115,030, issued April 26, 1938.

I claim:

1. The azo dye compounds having the general formula: R—N=N—R₁ wherein R represents the residue of a member selected from the group consisting of an aryl nucleus of the benzene series, an aryl nucleus of the naphthalene series and a benzothiazole nucleus and R₁ represents a member selected from the group consisting of an aryl nucleus of the benzene series and an aryl nucleus of the naphthalene series, said member (R₁) containing a nitroalkylamino group which is joined directly to the nucleus thereof through the nitrogen atom of the amino portion of said nitroalkylamino group and in which the nitro group is separated from the nuclear nitrogen atom by at least two carbon atoms.

2. The azo dye compounds having the general formula: R—N=N—R₁ wherein R represents the residue of a member selected from the group consisting of an aryl nucleus of the benzene series, an aryl nucleus of the naphthalene series and a benzothiazole nucleus and R₁ represents an aryl nucleus of the benzene series containing a nitroalkylamino group which is joined directly to said aryl nucleus through the nitrogen atom of the amino portion of said nitroalkylamino group and in which the nitro group is separated from the nuclear nitrogen atom by at least two carbon atoms.

3. The azo dye compounds having the general formula: R—N=N—R₁ wherein R represents the residue of an aryl nucleus of the benzene series and R₁ represents a member selected from the group consisting of an aryl nucleus of the benzene series and an aryl nucleus of the naphthalene series, said member containing a nitroalkylamino group which is joined directly to the nucleus thereof through the nitrogen atom of the amino portion of said nitroalkylamino group and in which the nitro group is separated from the nuclear nitrogen atom by at least two carbon atoms.

4. The azo dye compounds having the general formula: R—N=N—R₁ wherein R represents the residue of an aryl nucleus of the benzene series and R₁ represents an aryl nucleus of the benzene series containing a nitroalkylamino group which is joined directly to the nucleus thereof through the nitrogen atom of the amino portion of said nitroalkylamino group and in which the nitro group is separated from the nuclear nitrogen atom by at least two carbon atoms.

5. The azo dye compounds having the general formula: R—N=N—R₁ wherein R represents the residue of an aryl nucleus of the benzene series and R₁ represents a member selected from the group consisting of an aryl nucleus of the benzene series and an aryl nucleus of the naphthalene series, said member containing an unsubstituted nitroalkylamino group which is joined directly to the nucleus thereof through the nitrogen atom of the amino portion of said nitroalkylamino group and in which the nitro group is separated from the nuclear nitrogen atom by at least two carbon atoms.

6. The azo dye compounds having the general formula: R—N=N—R₁ wherein R represents the residue of a member selected from the group consisting of an aryl nucleus of the benzene series, an aryl nucleus of the naphthalene series and a benzothiazole nucleus and R₁ represents a member selected from the group consisting of an aryl nucleus of the benzene series and an aryl nucleus of the naphthalene series, said member (R₁) containing a β-nitroalkylamino group which is joined directly to the nucleus thereof through the nitrogen atom of the amino portion of said β-nitroalkylamino group.

7. The azo dye compounds having the general formula: R—N=N—R₁ wherein R represents the residue of a member selected from the group consisting of an aryl nucleus of the benzene series, an aryl nucleus of the naphthalene series and a benzothiazole nucleus and R₁ represents a member selected from the group consisting of an aryl nucleus of the benzene series and an aryl nucleus of the naphthalene series, said member (R₁) containing a nitroalkylamino group which is joined directly to the nucleus thereof through the nitrogen atom of the amino portion of said nitroalkylamino group and in which the nitro group is separated from the nuclear nitrogen atom by at least two carbon atoms and is attached to the omega carbon atom of the alkyl group.

8. The monoazo dye compounds having the general formula: R—N=N—R₁ wherein R represents the residue of an aryl nucleus of the benzene series and R₁ represents an aryl nucleus of the benzene series containing a β-nitroalkylamino group which is joined directly to the nucleus thereof through the nitrogen atom of the amino portion of said β-nitroalkylamino group.

9. The monoazo dye compounds having the general formula: R—N=N—R₁ wherein R represents the residue of an aryl nucleus of the benzene series and R₁ represents an aryl nucleus of the benzene series containing a nitroalkylamino group which is joined directly to the nucleus thereof through the nitrogen atom of the amino portion of said nitroalkylamino group and in which the nitro group is separated from the nuclear nitrogen atom by at least two carbon atoms and is attached to the omega carbon atom of the alkyl group.

10. The azo dye compounds having the general formula: R—N=N—R₁ wherein R and R₁ each represents an aryl nucleus of the benzene series containing but one benzene nucleus and wherein R₁ contains in para position to the azo bond a

group wherein R₂ represents a nitroalkyl group and in which the nitro group is separated from the nitrogen atom by at least two carbon atoms and R₃ represents a member selected from the group consisting of hydrogen, an alkyl group, a benzyl group and a cycloalkyl group.

11. The process of coloring material made of or containing an organic derivative of cellulose which comprises applying thereto a nuclear non-sulfonated monoazo dye compound having the general formula: R—N=N—R₁ wherein R represents the residue of an aryl nucleus of the benzene series and R₁ represents an aryl nucleus of the benzene series containing a nitroalkylamino group which is joined directly to the nucleus thereof through the nitrogen atom of the amino portion of said nitroalkylamino group and in which the nitro group is separated from the nuclear nitrogen atom by at least two carbon atoms.

12. The process of coloring a cellulose acetate which comprises applying thereto a nuclear non-sulfonated monoazo dye compound having the general formula: R—N=N—R₁ wherein R represents the residue of an aryl nucleus of the benzene series and R₁ represents an aryl nucleus of the benzene series containing a nitroalkylamino group which is joined directly to the nucleus thereof through the nitrogen atom of the amino portion of said nitroalkylamino group and in which the nitro group is separated from the nuclear nitrogen atom by at least two carbon atoms.

13. The process of coloring a cellulose acetate which comprises applying thereto a nuclear non-sulfonated monoazo dye compound having the general formula: R—N=N—R₁ wherein R represents the residue of an aryl nucleus of the benzene series and R₁ represents an aryl nucleus of the benzene series containing a β-nitroalkylamino group which is joined directly to the nucleus thereof through the nitrogen atom of the amino portion of said β-nitroalkylamino group.

14. Material made of or containing an organic derivative of cellulose colored with a nuclear non-sulfonated azo dye compound having the general formula: R—N=N—R₁ wherein R represents the residue of a number selected from the group consisting of an aryl nucleus of the benzene series, an aryl nucleus of the naphthalene series and a benzothiazole nucleus and R₁ represents a member selected from the group consisting of an aryl nucleus of the benzene series and an aryl nucleus of the naphthalene series, said member (R₁) containing a nitroalkylamino group which is joined directly to the nucleus thereof through the nitrogen atom of the amino portion of said nitroalkylamino group and in which the nitro group is separated from the nuclear nitrogen atom by at least two carbon atoms.

15. A cellulose acetate colored with a nuclear non-sulfonated azo dye compound having the general formula: R—N=N—R₁ wherein R represents the residue of a member selected from the group consisting of an aryl nucleus of the benzene series, an aryl nucleus of the naphthalene series and a benzothiazole nucleus and R₁ represents a member selected from the group consisting of an aryl nucleus of the benzene series and an aryl nucleus of the naphthalene series, said member (R₁) containing a nitroalkylamino group which is joined directly to the nucleus thereof through the nitrogen atom of the amino portion of said nitroalkylamino group and in which the nitro group is separated from the nuclear nitrogen atom by at least two carbon atoms.

JOSEPH B. DICKEY.